United States Patent
Glover et al.

(10) Patent No.: US 7,789,462 B2
(45) Date of Patent: Sep. 7, 2010

(54) CHILD RESTRAINT LOWER ANCHORAGE FOR A MOTOR VEHICLE SEAT

(75) Inventors: Mickey E. Glover, Damascus, AR (US); Mike E. Woods, Conway, AR (US); Robert L. Douglas, Conway, AR (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 375 days.

(21) Appl. No.: 11/938,499

(22) Filed: Nov. 12, 2007

(65) Prior Publication Data
US 2008/0111411 A1     May 15, 2008

Related U.S. Application Data

(60) Provisional application No. 60/865,730, filed on Nov. 14, 2006.

(51) Int. Cl.
A47C 31/00 (2006.01)
(52) U.S. Cl. .................................. 297/254; 297/253
(58) Field of Classification Search ................ 297/253, 297/464, 216.11, 254, 463.1
See application file for complete search history.

(56) References Cited

U.S. PATENT DOCUMENTS

| | | | | |
|---|---|---|---|---|
| 4,637,650 A | * | 1/1987 | Inoue | 297/410 |
| 5,009,469 A | * | 4/1991 | Mouri | 297/468 |
| 5,918,934 A | | 7/1999 | Siegrist | |
| 6,253,713 B1 | * | 7/2001 | Giedeman et al. | 119/771 |
| 6,322,141 B1 | * | 11/2001 | Dutkievic et al. | 297/218.1 |
| 6,478,376 B2 | * | 11/2002 | Hayashi et al. | 297/250.1 |
| 6,582,016 B1 | * | 6/2003 | Kirchoff et al. | 297/253 |
| 6,666,504 B2 | * | 12/2003 | Guanzon et al. | 296/222 |
| 6,767,057 B2 | | 7/2004 | Neelis | |
| 7,281,763 B1 | * | 10/2007 | Hayashi et al. | 297/253 |
| 7,328,947 B2 | * | 2/2008 | Laporte et al. | 297/254 |
| 2004/0051356 A1 | | 3/2004 | Neelis | |
| 2004/0080194 A1 | | 4/2004 | Medvecky et al. | |

* cited by examiner

*Primary Examiner*—Sarah B McPartlin
(74) *Attorney, Agent, or Firm*—Jeffrey P. Calfa; Mark C. Bach (57) ABSTRACT

The invention is a lower anchorage system to be used with a child restraint in a motor vehicle. The lower anchorage system has a trim assembly that attaches to an anchorage bar that in turn is affixed to an anchorage support. The trim assembly includes a trim apparatus that fits within an anchorage box. Both the anchorage box and the trim apparatus engage to the anchorage bar.

13 Claims, 9 Drawing Sheets

CHILD RESTRAINT LOWER ANCHORAGE FOR A MOTOR VEHICLE SEAT

PRIORITY

The present application claims the benefit of U.S. Provisional Application No. 60/865,730 filed on Nov. 14, 2006.

BACKGROUND OF THE INVENTION

1. Field of the Invention

The present invention relates to a child restraint lower anchorage system for the seat of a motor vehicle and used with.

2. Description of the Prior Art

Child restraints may protect small children in a motor vehicle from harm in an accident. To fully protect a child, however, the child restraints must be properly latched to the vehicle. A number of countries, including the United States, require particular latching mechanisms anchored to the motor vehicle itself and not merely the seat, such as upper tethers and lower anchorages.

The motor vehicle's lower anchorage for a child restraint has an anchorage bar attached to the seat frame and consequently the motor vehicle. The child restraint attaches to the anchorage bars, either with a tether hook or jaw-like latches. The configuration of the anchorage bars, such as their dimensions, strength and locations, are specified by government regulations and laws. The anchorage bars are in the bight of the vehicle seat, where the back and bottom of the vehicle seat meet. This location allows passengers in the motor vehicle to sit comfortably in the seat when not using a child restraint.

A buried anchorage bar, however, can be difficult to latch onto with the child restraint. The anchorage bars are not always easy to find, requiring one to fumble around in the bight to find the anchorage bars to attach the child restraint. This is both time consuming and frustrating, especially if one has a squirming child to watch while latching the child restraint to the seat. For a bus transporting young children, this fumbling about is very time consuming for the bus driver.

Some jurisdictions require passengers in a school bus to wear a seat belt. These school buses have bench seats with seat belts. Smaller and younger children as found in the lower grades and nursery schools, however, may not be fully protected with a standard seat belt and therefore must use a child restraint instead. Some organizations require requires the installation of the anchorage systems for the child restraints. Anchorage systems provide the ability to quickly and easily latch and unlatch the child restraint to seat and unseat the small child.

Therefore, there is a need for a lower anchorage system that allows the easy latching of a child restraint in a motor vehicle seat. This system must be easily accessible to use with a child restraint without being uncomfortable for a passenger sitting on the seat without the child restraint.

SUMMARY OF THE INVENTION

According to the invention there is provided a lower anchorage system for a motor vehicle seat that is used with child restraints. The lower anchorage system has a trim assembly that attaches to an anchorage bar that in turn is affixed to an anchorage support that is typically part of the motor vehicle seat.

The trim assembly includes a trim apparatus that fits within an anchorage box. Both the trim apparatus and the anchorage box engage the anchorage bar. The anchorage box has opposite first and second box sidewalls, a top and opposite bottom located between the box sidewalls, an open front, and a back opposite the front.

The trim apparatus has opposite first and second sidewalls, a trim top and opposite trim bottom being located between the sidewalls, a rear, and a mouth opposite the rear. A trim slit in each sidewall extends approximately horizontally from the rear toward the mouth and ends with a slit terminus. The slit engages the anchorage bar at the slit terminus.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Turning to the Figures where like reference numerals refer to like structures, a motor vehicle 100, such as a school bus, has seats that are fitted with a lower anchorage bar. The lower anchorage system 10 has an anchorage bar to which a child restraint is attached.

Figure 1:
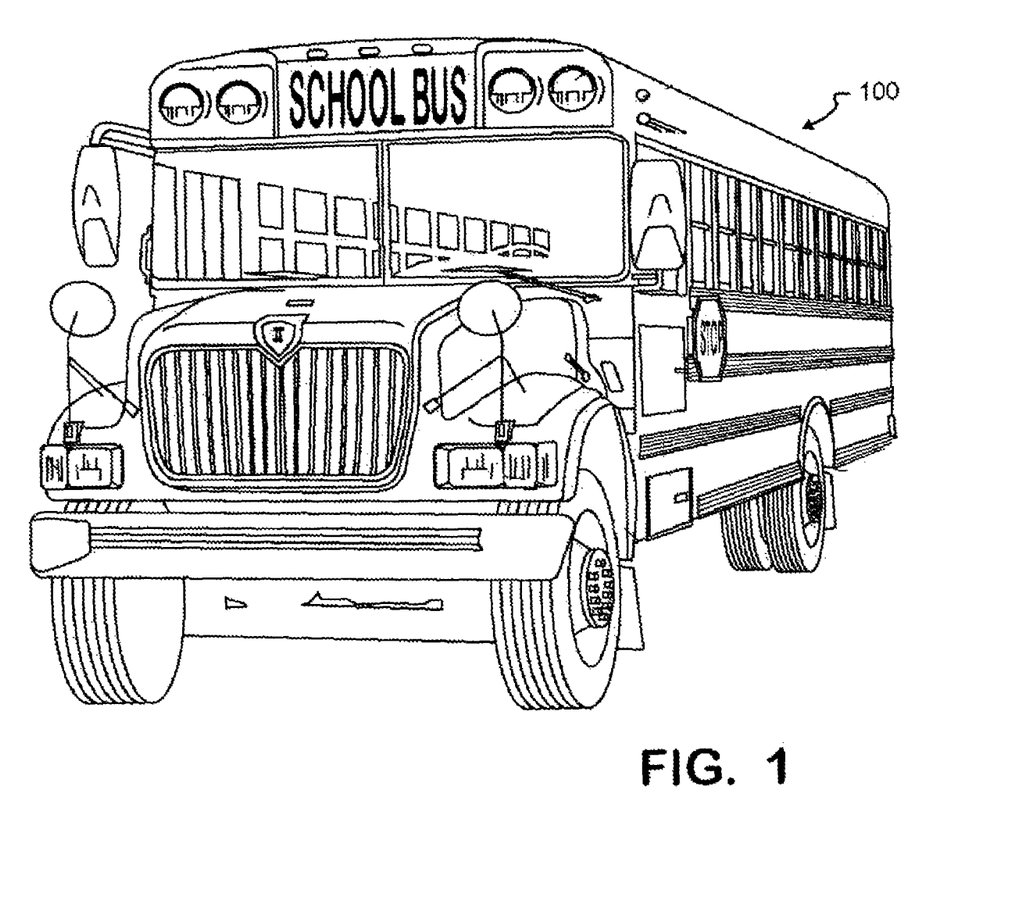
FIG. 1 is a perspective view of a school bus with seats that may have a anchorage system of the invention.
Figures 2, 3:
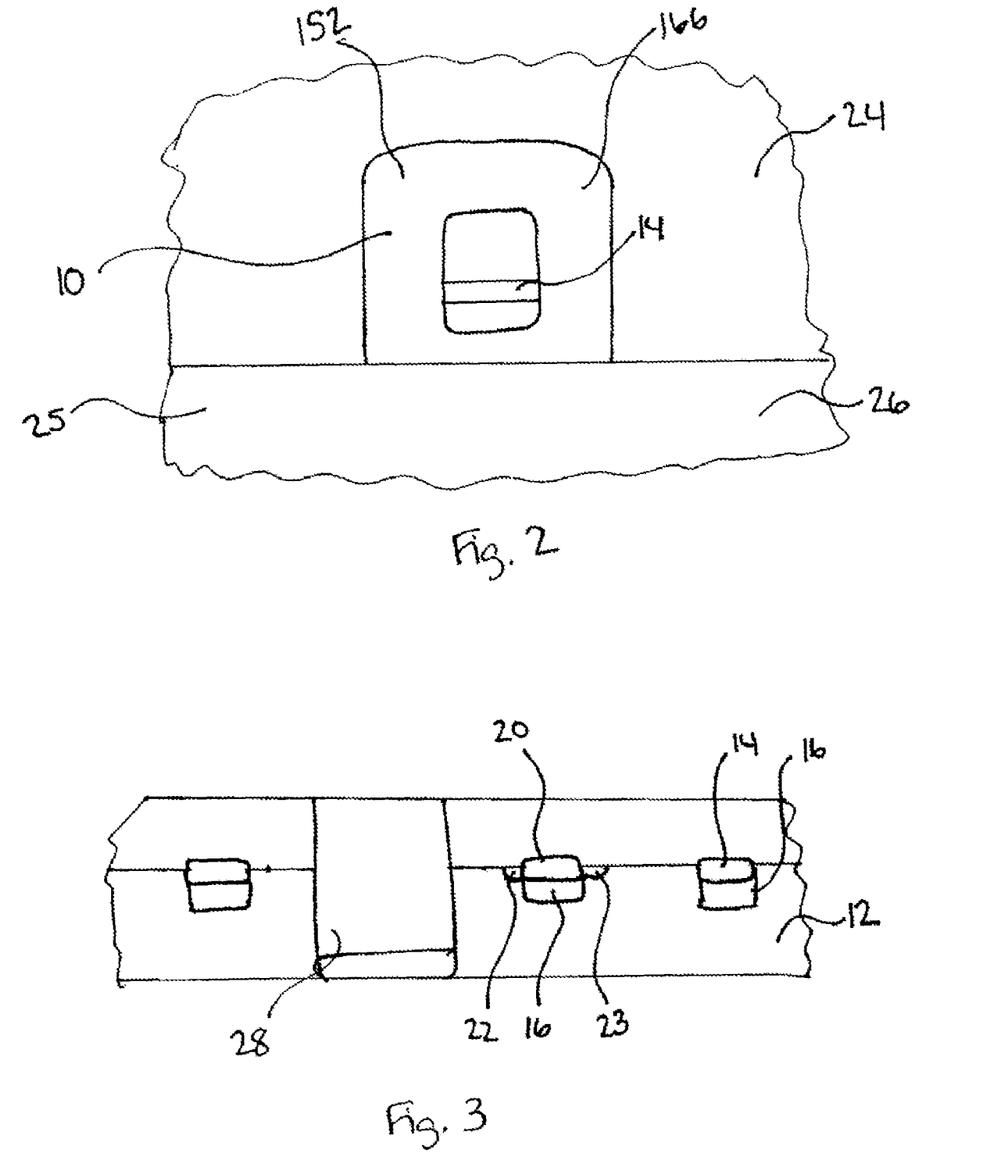
FIG. 2 is a front plan partial view of vehicle seat with one of the embodiments of the invention.
FIG. 3 is a front plan partial view of a vehicle's seat back frame assembly illustrating two ways of attaching an anchorage bar.

The seat 25 which is mounted to the bus floor has a seat back 24 and seat bottom 26 that are upholstered over the respective frame assemblies when fully assembled. The seat back 24 has a seat back frame assembly 28, the bottom of which provides an anchorage support 12 and attaches to the motor vehicle 100, such as the chassis. The anchorage support 12 can have the anchorage bars 14 built into the seat back frame assembly 28. The anchorage support 12 has cut-outs 16 spaced apart at the required distances for the lower anchorage system 10 with the anchorage bar 14 welded to the anchorage support 12.

Alternatively, an anchorage bracket can be affixed to the anchorage support 12, such as by welding. The anchorage bracket has the anchorage bar 20 and first and second tabs 22, 23 located at each end of the anchorage bar 20. The first and second tabs 22, 23 are affixed to the top edge of the anchorage support 12 at the sides of the cut-outs 16 located at the desired locations.

Figure 4:
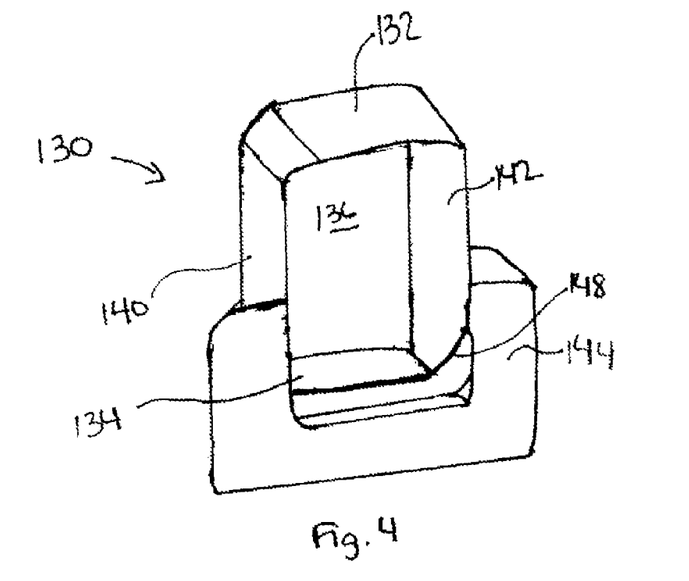
FIG. 4 is a perspective view of one embodiment of an anchorage box of the invention.

A trim assembly 180 of an anchorage box 130 and trim apparatus 152 engages the anchorage bar 14. The anchorage box 130 has a top 132, a bottom 134, a back 136, an open front 138 and opposite first and second box sidewalls 140, 142 therebetween. The back 136 and the bottom 134 can be open, if desired. The top 132 can have a bore 133.

A cover plate 144 can be used to cover part of the open front 138 of the anchorage box 130. The cover plate 144 extends laterally from about the middle of box sidewalls 140, 142 at the open front 138 and downwardly beyond the bottom 134 of the anchorage box 130 and can be U-shaped. When in use, the cover plate 144 extends beyond the bottom 134 of the anchorage box 130 to at least partially cover the cut-out 16. While the cover plate 144 is typically integral with the anchorage box 130, the cover plate can be attached to the anchorage box.

Figure 16:
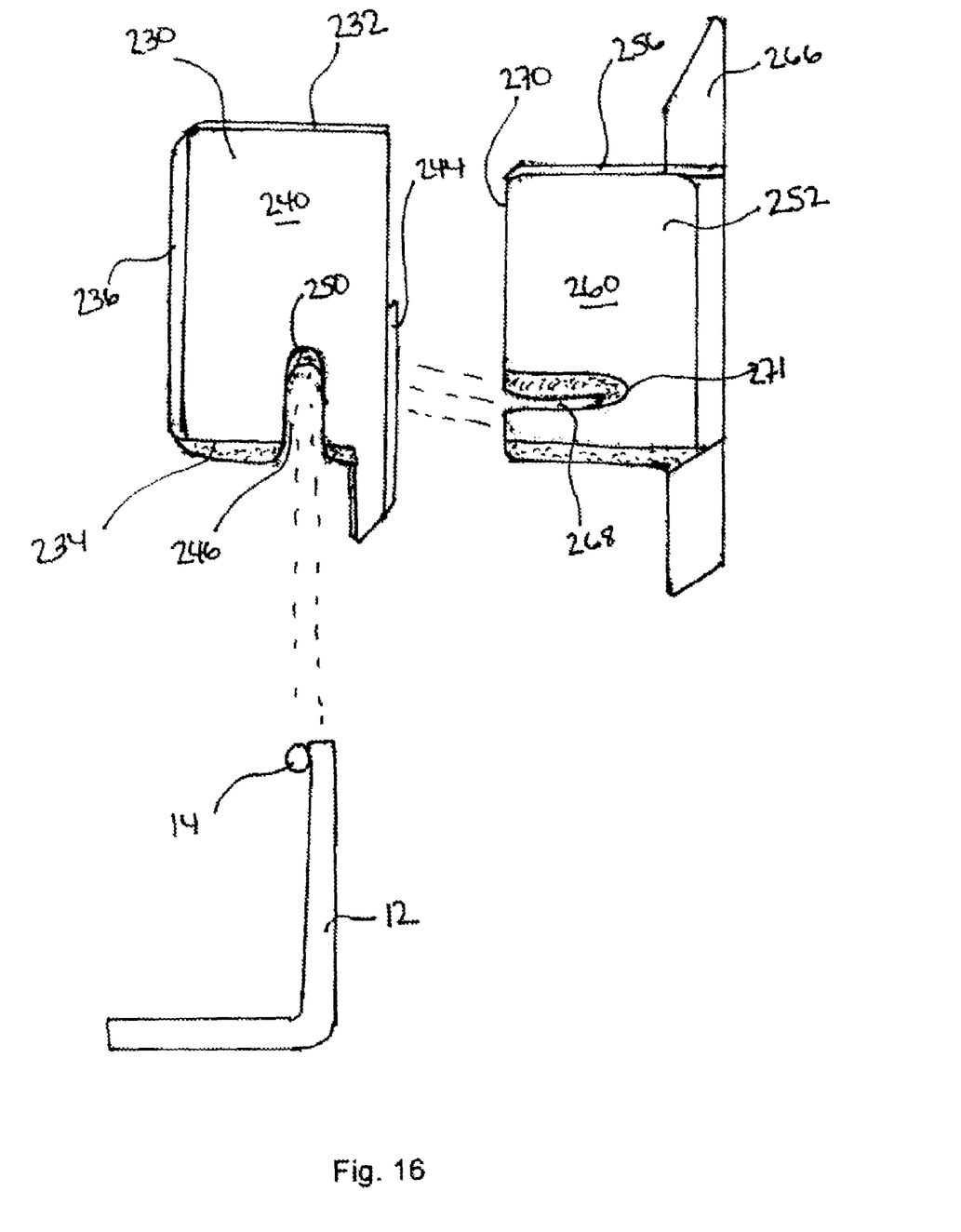
FIG. 16 is an exploded view of one embodiment of a trim apparatus and an anchorage box of the invention.

The anchorage box 130 has a slot 146 to engage the anchorage bar 14, such as by frictionally fitting against the anchorage bar 14. The slot 146 can be vertical and form between the cover plate 144 and the box sidewalls 140, 142. In the embodiment shown in FIGS. 4 and 5, the first and second box sidewalls 140, 142 have a rearward slanting slot side 148 extending from the slot terminus 150 to the bottom 134 to form one side of the slot 146. A rear face of the cover plate 144 forms the other side of the slot 146. The slot terminus 150 is preferably smaller than the opening 151 to the slot 146. Alternatively as shown in FIG. 16, the slot 246 can be located in the box sidewalls 240, 242 and can be U-shaped, although the slot terminus 250 can be wider than the walls of the slot 246.

Figure 7:
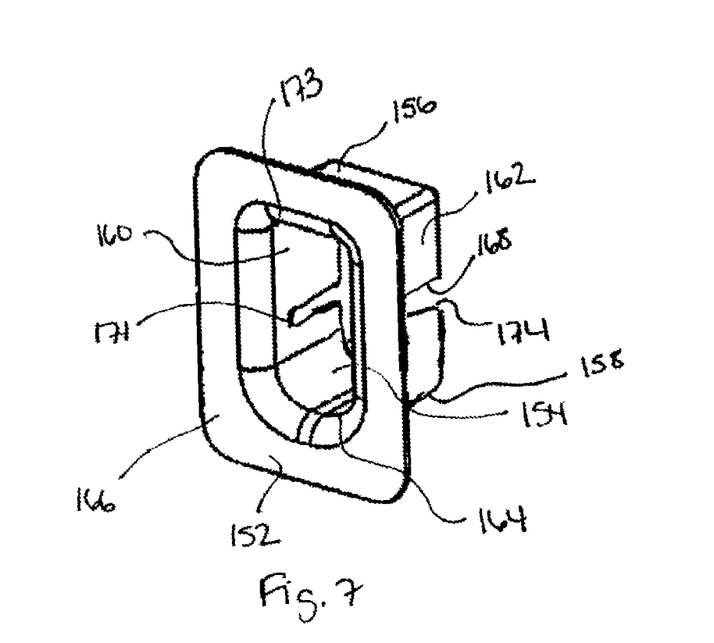
FIG. 7 is a perspective view of one embodiment of a trim apparatus of the invention.

The trim apparatus 152 engages the anchorage bar 14 and fits within the anchorage box 130. The trim apparatus 152 has a chamber 154 defined by a trim top 156, a trim bottom wall 158 and opposite first and second sidewalls 160, 162 located between the trim top 156 and trim bottom wall 158 and a mouth 164 opposite the rear 170. The trim top 156 can have a button 157 or tab to matingly engage the bore 133 of the anchorage box 130.

A face plate 166 extends outwardly from the walls of the trim apparatus 152 and surrounds the mouth 164. The face plate 166 can be rectangular. The face plate 166 abuts the upholstery of the seat back 24 and can cover the cut-out 16 and cover plate 146 if one is used. While the face plate 166 is typically integral with the walls of the trim apparatus 152, the face plate can be attached to the walls of the trim apparatus as shown in FIG. 16. The trim top 156, trim bottom wall 158 and opposite first and second sidewalls 160 can have a linear section 172 and a curved section 173 forming a border 176 curving toward the face plate 166.

The first and second sidewalls 160, 162 each have a trim slit 168 extending approximately horizontally from the rear 170 partway toward the mouth 164 and ending in the slit terminus 171. The trim slit 168 can be U-shaped or V-shaped. While no trim rear wall is needed, if a trim rear wall is used, the trim rear wall is separated at the trim slit opening 174.

In FIG. 16, the anchorage box 230 has a top 232, a bottom 234, a closed back 236, an open front 238 and opposite first and second sides 240 therebetween. The trim apparatus 252 has a face plate 266, a trim top 256, a rear 270, and opposite first and second sidewalls 260 between the rear 270 and the face plate 266.

Figure 5:
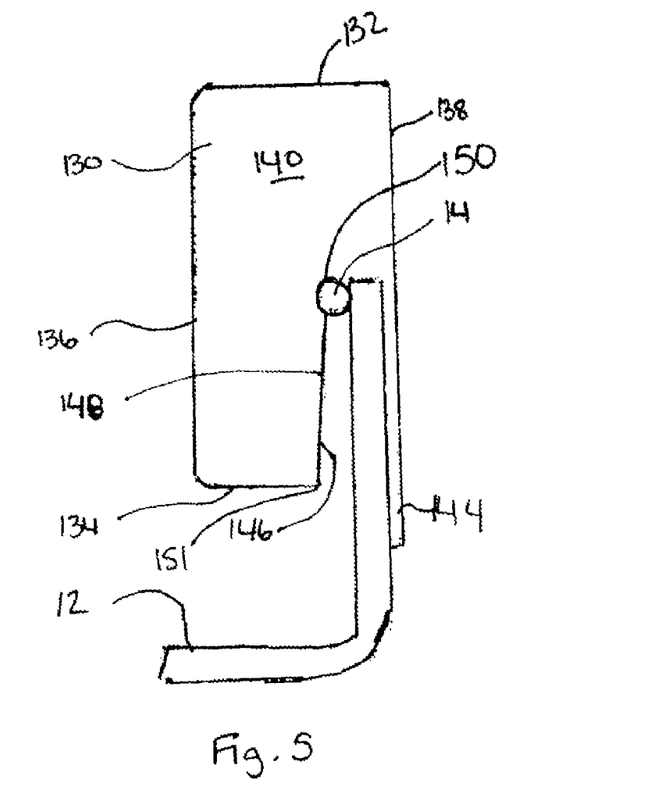
FIG. 5 is a side view of one embodiment of an anchorage box of the invention affixed to the anchorage bar.
Figure 6:
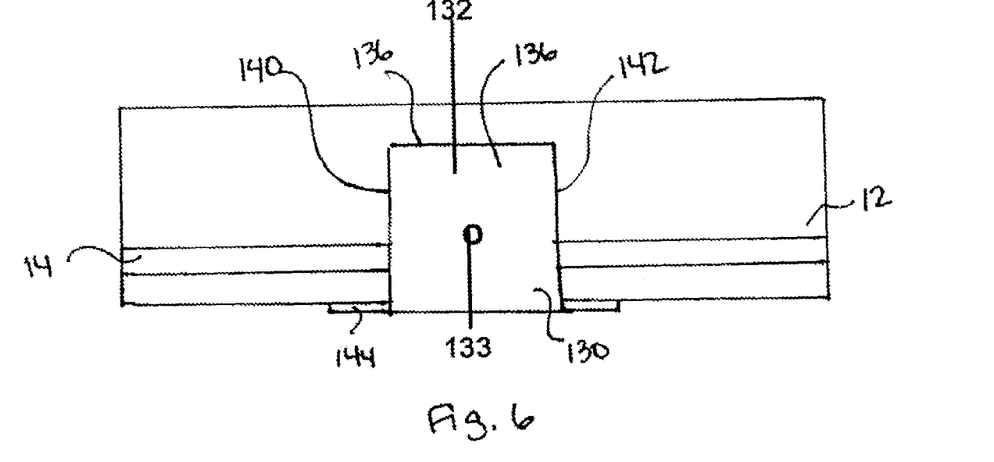
FIG. 6 is a top plan view of one embodiment of an anchorage box of the invention affixed to the anchorage bar.

In use, the anchorage box 130 first engages the anchorage bar 14 by locking the slots 146 onto the anchorage bar 14, typically from behind the anchorage support 12. This step can be done after the foam and the upholstery are added to the seat bottom 26 or before the seat bottom is upholstered. The cover plate 144 of the anchorage box 130 should at least partially if not completely cover the cut-out 16 in the anchorage support 12.

Figure 8:
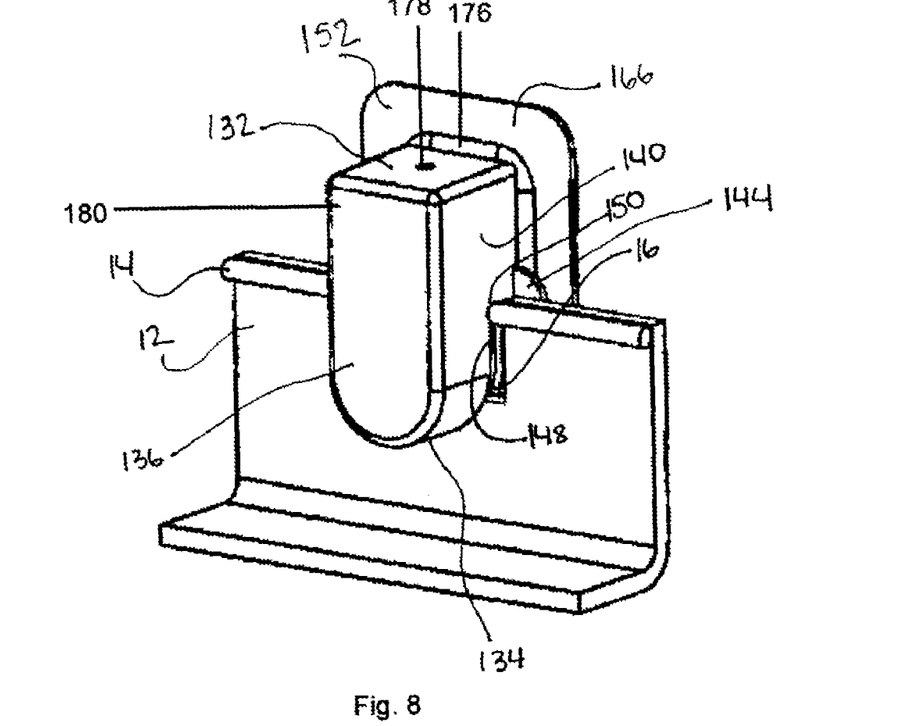
FIG. 8 is a rear perspective view of one embodiment of a trim apparatus inserted within an anchorage box of the invention.
Figure 9:
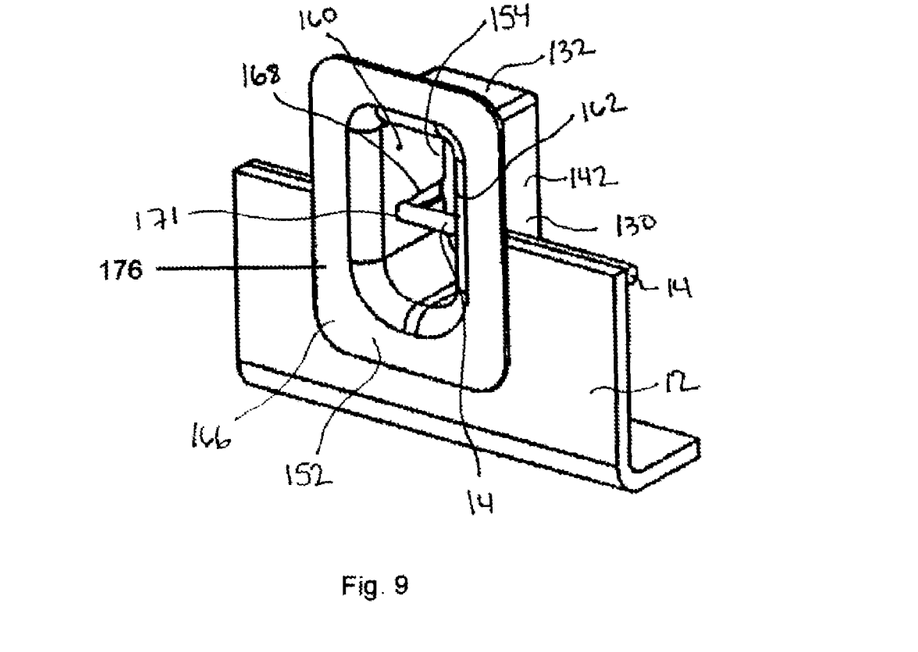
FIG. 9 is a front perspective view of one embodiment of a trim apparatus inserted within an anchorage box of the invention.
Figures 10, 11:
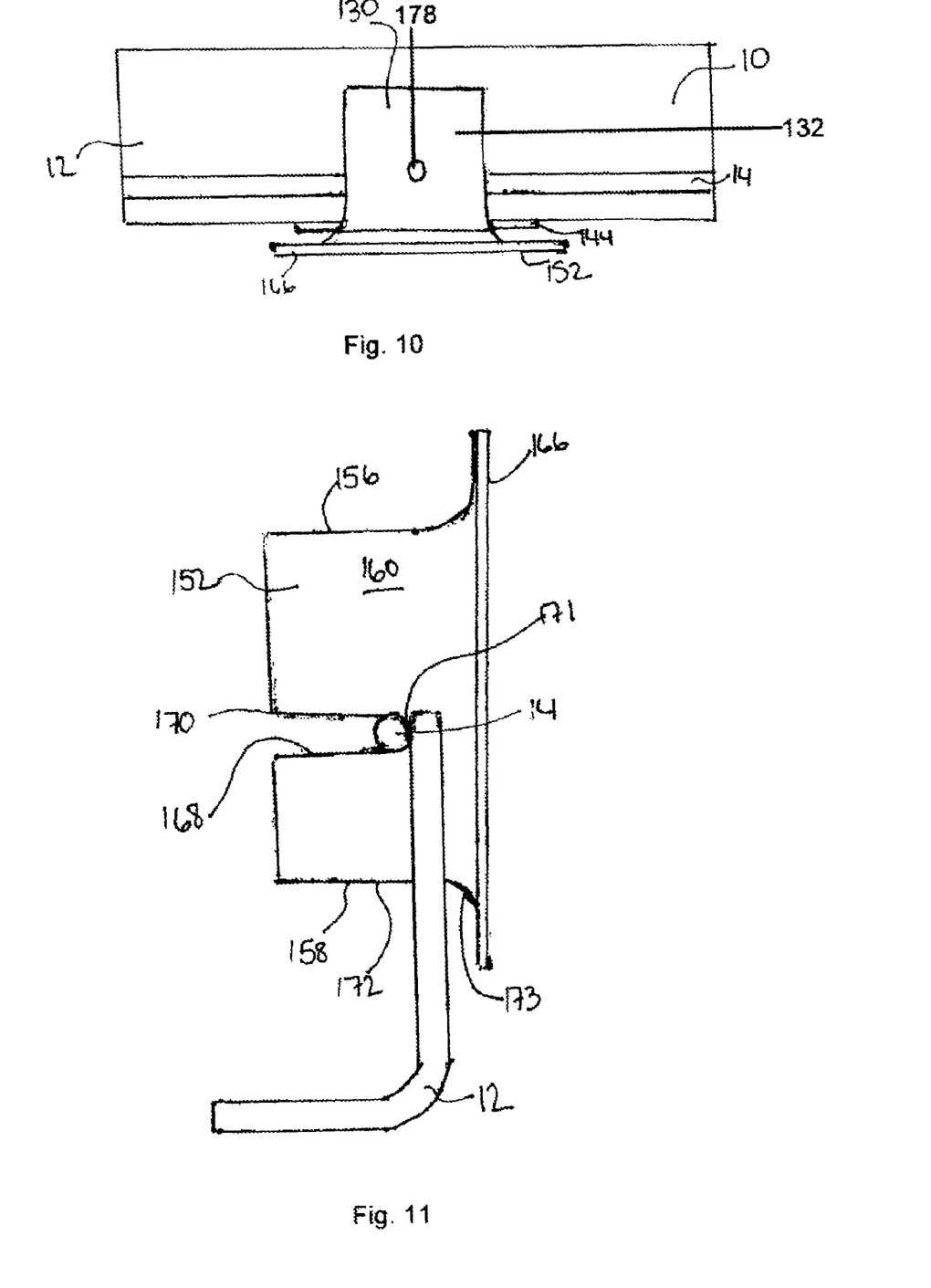
FIG. 10 is a top plan view of one embodiment of a trim apparatus inserted within an anchorage box of the invention.
FIG. 11 is a side view of one embodiment of a trim apparatus of the invention affixed to the anchorage bar with the anchorage box removed.
Figure 12:
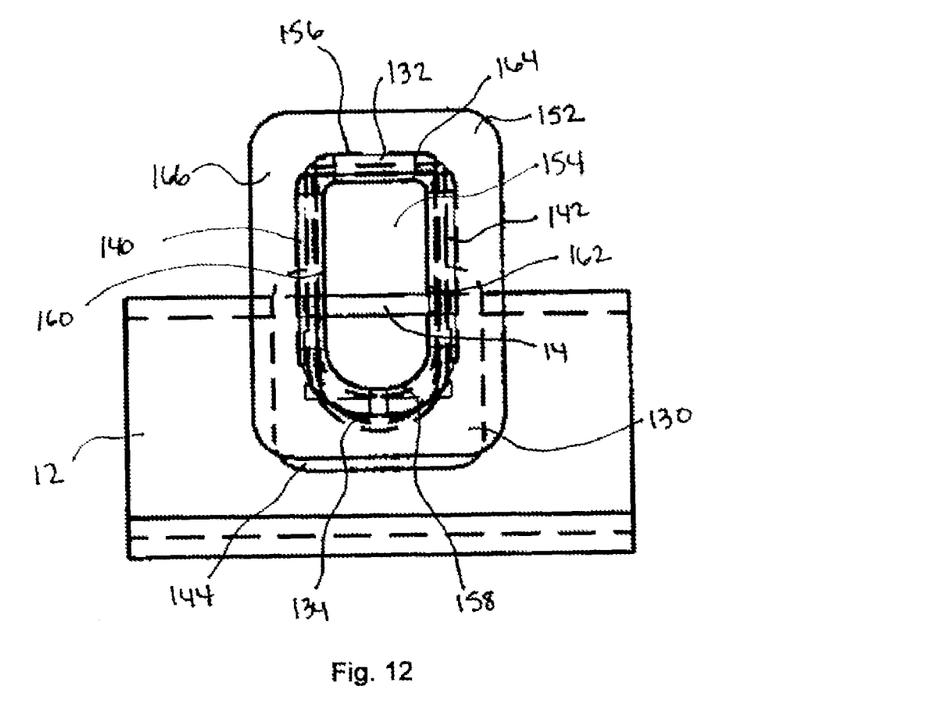
FIG. 12 is a front plan view of one embodiment of a trim apparatus inserted within an anchorage box of the invention with the hidden components in phantom.
Figure 13:
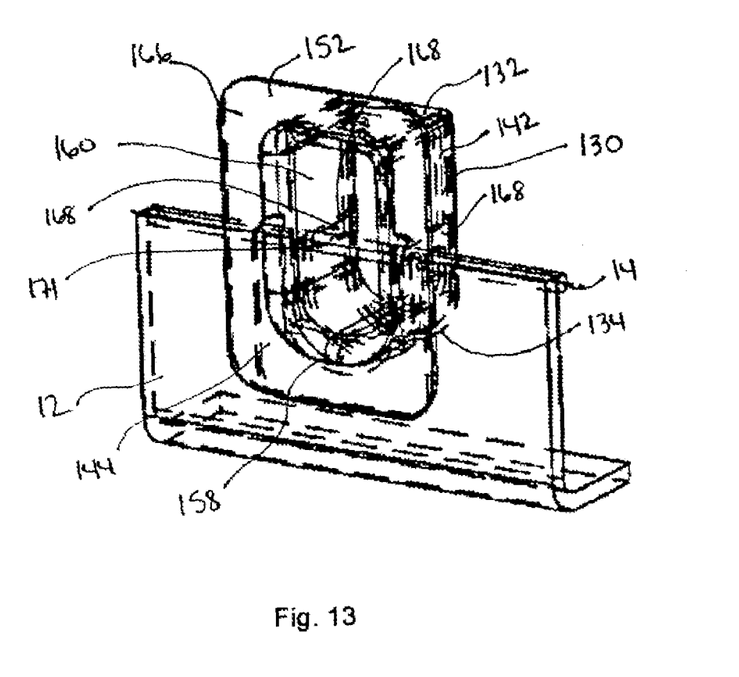
FIG. 13 is a perspective view of one embodiment of a trim apparatus inserted within an anchorage box of the invention with the hidden components in phantom.
Figure 14:
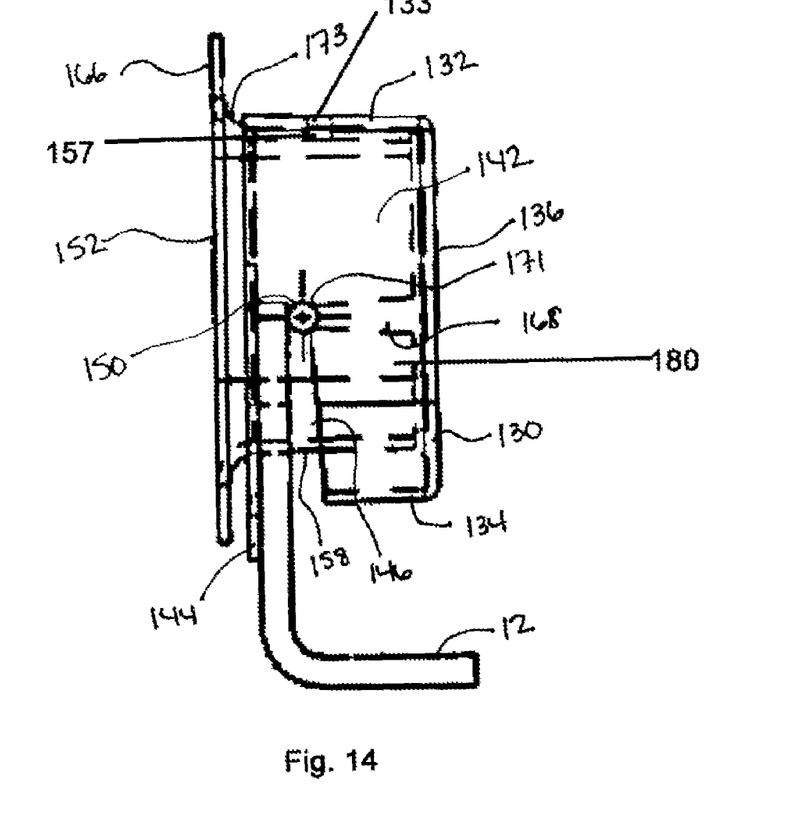
FIG. 14 is a side view of one embodiment of a trim apparatus inserted within an anchorage box of the invention with the hidden components in phantom.
Figure 15:
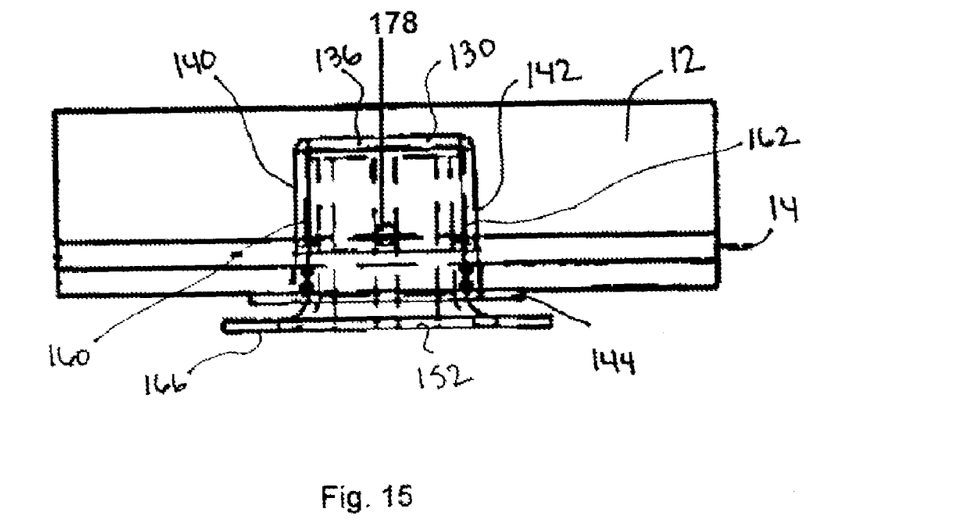
FIG. 15 is a top plan view of one embodiment of a trim apparatus inserted within an anchorage box of the invention with the hidden components in phantom.

Next, the seat back 24 can be upholstered with foam padding and upholstery material while leaving an opening at the anchorage box 130. The trim apparatus 152 fits into the anchorage box 130 by sliding the trim slits 168 onto the anchorage bar 14 and locking the trim apparatus 152 in place with the trim slits 168. The trim apparatus 152 can also lock within the anchorage box 130 with a trim lock 178 formed when the button 157 on the trim apparatus 152 inserts within the bore 133 of the anchorage box 130. The face plate 166 can rest against the foam padding and upholstery material, covering any unsightly fabric edges around the anchorage box 130.

The trim apparatus 152 is designed to fit within the anchorage box 130 after locking onto the anchorage bar 14. Therefore, if the bottom of the anchorage box is straight, the trim bottom wall should be straight. If the bottom of the anchorage box is curved, the trim bottom wall of the trim apparatus can be curved.

While the invention can be readily assembled when forming the seat, the invention can also include a kit of parts used to assemble the trim assembly 180. The kit of parts includes the anchorage box 130, 230 and the trim apparatus 152, 252.

There are several advantages to the lower anchorage system of the invention. The anchorage itself is part of the seat frame assembly and the trim does not require any tools to use. This reduces multi-part weldments and the requirement for additional cut-outs in the seat back foam and upholstery.

This invention locates the required lower anchorage within the back cushion in view of the user for ease of use. The lower anchorage is easy to see and use. The user easily attaches and detaches the child restraint with the lower anchorage.

The invention reduces manufacturing cost and rework and can eliminate special markings on the seat back. Because the anchorage box and the trim apparatus independently engage the anchorage bar, the anchorage system is sturdy and resistant to separation from each other and the anchorage bar when in use.

While the invention is shown in only one of its forms, it is not thus limited but is susceptible to various changes and modifications without departing from the spirit and scope of the invention.

What is claimed is:

1. A lower anchorage system for a motor vehicle seat, comprising:

an anchorage box comprising opposite first and second box sidewalls, a top and opposite bottom being located between the box sidewalls, an open front, and a back opposite the front;
a trim apparatus fitting within the anchorage box and comprising opposite first and second sidewalls, a trim top and opposite trim bottom being located between the opposite first and second sidewalls, a rear, and a mouth opposite the rear;
an anchorage bar;
a trim slit in each of the opposite first and second sidewalls extending approximately horizontally from the rear toward the mouth and ending with a slit terminus engaging the anchorage bar;
an anchorage support being affixed to the anchorage bar; the anchorage box has slots attaching to the anchorage bar; a trim lock locking the anchorage box and the trim apparatus together;
a bore; and
a button inserting within the bore, wherein each slot is vertical.

2. A lower anchorage system for a motor vehicle seat of claim 1, wherein the anchorage support attaches to the motor vehicle.

3. A lower anchorage system for a motor vehicle seat, comprising:
an anchorage box comprising opposite first and second box sidewalls, a top and opposite bottom being located between the box sidewalls, an open front, and a back opposite the front;
a cover plate extending laterally from the box sidewalls at the front and downwardly beyond the bottom;
a trim apparatus fitting within the anchorage box and comprising opposite first and second sidewalls, a trim top, an opposite trim bottom being located between the sidewalls, a rear, and a mouth opposite the rear;
a face plate extending outwardly from the trim top, sidewalls, and trim bottom opposite the rear;
an anchorage bar being attached to the anchorage box and the trim apparatus; and
an anchorage support being affixed to the anchorage bar, wherein the anchorage bar attaches to slots in the anchorage box and a trim slit in each sidewall of the trim apparatus.

4. A lower anchorage system for a motor vehicle seat of claim 3, wherein each slot is formed between the cover plate and the box sidewalls.

5. A lower anchorage system for a motor vehicle seat of claim 4, wherein each slot is formed by a rearward slanting slot side of the box sidewall extending from a slot terminus to the bottom and a rear face of the cover plate.

6. A lower anchorage system for a motor vehicle seat of claim 5, wherein each trim slit extends approximately horizontally from the rear toward the mouth and ends with a slit terminus engaging the anchorage bar.

7. A lower anchorage system for a motor vehicle seat of claim 6, wherein the trim top, sidewalls and trim bottom have a curved section curving toward the face plate.

8. A lower anchorage system for a motor vehicle seat of claim 7, further comprising:
a trim lock locking the anchorage box and the trim apparatus together.

9. A lower anchorage system for a motor vehicle seat of claim 8, wherein the trim lock further comprises:
a bore; and
a button inserting within the bore.

10. A kit of parts capable of being assembled into a trim assembly for a lower anchorage system of a motor vehicle seat, comprising:
an anchorage box comprising opposite first and second box sidewalls, a top and opposite bottom being located between the box sidewalls, an open front, and a back opposite the front, a cover plate extending laterally from the box sidewalls at the front and downwardly beyond the bottom;
and a slot being at least partially formed in each box sidewall; and
a trim apparatus for inserting within the anchorage box and comprising opposite first and second sidewalls, a trim top and opposite trim bottom being located between the sidewalls, a rear, and a mouth opposite the rear, a trim slit in each sidewall extending approximately horizontally from the rear toward the mouth and ending with a slit terminus, and a face plate extending outwardly from the trim top, sidewalls, and trim bottom opposite the rear.

11. A kit of parts capable of being assembled into a trim assembly for a lower anchorage system of a motor vehicle seat of claim 10, wherein each slot is formed by a rearward slanting slot side of the box sidewall extending from a slot terminus to the bottom and a rear face of the cover plate.

12. A kit of parts capable of being assembled into a trim assembly for a lower anchorage system of a motor vehicle seat of claim 11, wherein the trim top, sidewalls and trim bottom have a curved section curving toward the face plate.

13. A kit of parts capable of being assembled into a trim assembly for a lower anchorage system of a motor vehicle seat of claim 12, further comprising:
a bore in the top of the anchorage box; and
a button in the top of the trim apparatus to engage the bore when assembled.

* * * * *